United States Patent Office 2,806,007
Patented Sept. 10, 1957

2,806,007

PRODUCTION OF RESINS FROM FORMALDEHYDE AND REACTION PRODUCT OF PHENOL AND ALGINIC ACID

Carl B. Linn, Riverside, Ill., assignor to Universal Oil Products Company, Des Plaines, Ill., a corporation of Delaware No Drawing. Application August 30, 1954,
Serial No. 453,161

6 Claims. (Cl. 260—17.2)

This application is a continuation-in-part of my co-pending application Serial Number 401,068, filed December 29, 1953.

This invention relates to a process for producing resins which are useful as surface coating agents, and as starting materials for production of molded plastic articles.

An object of this invention is to produce a molding resin.

Another object of this invention is to produce a resin suitable for producing therefrom laminated plastics in which cloths, paper, wood, etc. are bonded together by means of this resin.

One embodiment of this invention is a resin formed by reacting formaldehyde with a product formed by condensing alginic acid and a phenol in the presence of hydrogen fluoride catalyst.

Another embodiment of this invention is a process for producing a resin which comprises reacting formaldehyde in the presence of an alkaline catalyst with an alginic acid-phenol condensation product formed in the presence of hydrogen fluoride.

A further embodiment of this invention is a process for producing a resin which comprises reacting formaldehyde in the presence of an acidic catalyst with a condensation product formed by reacting alginic acid with a phenol in the presence of hydrofluoric acid.

I have found that resins useful as surface coating materials and as molding resins are formed by reacting formaldehyde or its polymer with a hydroxy arylated alginic acid formed by condensing a phenol with alginic acid in the presence of liquid hydrofluoric acid at a temperature of from about —40° to about 100° C. The condensation of the hydroxy arylated alginic acid with formaldehyde or its polymers may be catalyzed by alkalies or by acids to produce useful types of resins as hereinafter illustrated by the examples of this application.

Alginic acid which is used as a starting material in this process may be obtained from the giant kelp of the Pacific Ocean and is composed of uronic acid units.

Typical utilizable hydroxy aromatic hydrocarbons include phenol, o-cresol, m-cresol, p-cresol, o-chlorophenol, p-chlorophenol, m-chlorophenol, p-bromophenol, 2,4,6-p-chlorophenol, m-chlorophenol, p-bromophenol, 2,4,6-trichlorophenol, 2,4,6-tribromophenol, o-nitrophenol, m-nitrophenol, p-nitrophenol, 2,4-dinitrophenol, guaiacol, eugenol, isoeugenol, saligenin, carvacrol, thymol, o-hydroxyacetophenone, p-hydroxyacetophenone, o-hydroxydiphenyl, p-hydroxydiphenyl, o-cyclohexylphenol, p-cyclohexylphenol, catechol, resorcinol, hydroquinone, pyrogallol, hydroxyhydroquinone, phloroglucinol, o-aminophenol, m-aminophenol, p-aminophenol, etc. These hydroxy aromatic compounds are referred to broadly by the term "phenols."

The hydrogen fluoride catalyst which is used in the condensation of alginic acid with phenols may be used in anhydrous form or diluted with water to make a hydrofluoric acid of the desired concentration. The hydrofluoric acid may also be diluted further with various inert diluents when it is desirable to operate the condensation process with low hydrogen fluoride concentrations. Suitable inert diluents include perfluoro derivatives of normal paraffinic hydrocarbons such as perfluoro propane, perfluoro n-butane, perfluoro n-pentane, perfluoro n-hexanes, etc. In some instances, hydrofluoric acids of from about 85% to about 100% HF concentration is desirable, and in some other instances, it is more desirable to use substantially anhydrous hydrogen fluoride as the catalyst.

The condensation of alginic acid with a phenol may be carried out by adding hydrogen fluoride catalysts slowly to a stirred mixture of the phenol and alginic acid, or by the reverse procedure, that is, adding a mixture of a phenol and alginic acid to the hydrogen fluoride catalyst while maintaining the reaction temperature at from about —40° to about 100° C. by suitable cooling and/or heating means. It is often desirable or advisable to commingle the reactants and catalyst at a relatively low temperature such as from about —80° to about —30° C. and then to permit the reaction mixture to warm gradually while the reactants and catalyst are stirred by suitable means such as a motor driven stirrer or other adequate mixing equipment. After the reaction has reached a desired degree of completion, the hydrogen fluoride catalyst is removed from the reaction mixture by distillation at atmospheric or lower pressure, or by passing an inert gas through the reaction mixture while maintaining it at relatively low temperature. Also, the entire reaction mixture and catalyst may be mixed with water or may be added to ice in order to quench the activity of the hydrogen fluoride catalyst and permit separation of the organic reaction products and unreacted starting materials from the catalyst. The organic reaction product may also be separated from aqueous hydrogen fluoride by means of an organic solvent such as ether, in which some of the organic material may be dissolved. Further methods of isolating the reaction products are illustrated in the example. Thus the product formed by reacting phenol with alginic acid in the presence of substantially anhydrous hydrogen fluoride at 0° was separated into an ether-soluble and water-insoluble product and an ether-insoluble and water-soluble product.

The type of product is markedly affected by the length of time that the reactants are in contact with the hydrogen fluoride catalyst as well as the temperature of the reaction. This time factor will be set forth in greater detail hereinafter in examples.

The condensation product produced from alginic acid and phenol in the presence of hydrogen fluoride was then condensed with formalin, 36–38% formaldehyde in water. Also, polymers of formaldehyde may be used in this condensation reaction, these being generally referred to as polyoxymethylene having the formula $(CH_2O)_x$ and also sometimes referred to as symmetrical trioxane or as alpha-trioxymethylene. Both acidic and basic catalysts may be used in the condensation reaction of formaldehyde with the phenolalginic acid reaction product to give resinous materials as illustrated further in the examples.

The following examples are given to illustrate the process of this invention, but with no intention of unduly limiting its generally broad scope.

EXAMPLE I

This example illustrates the reaction of phenol with alginic acid. Alginic acid is a polysaccharide composed of uronic acid units. This reaction was studied at 0° C. in three different experiments which involved the utilization of hydrogen fluoride as the catalyst. In the first experiment, the contacting was for a period of two hours time; in the second experiment, the contacting was for a period of four hours time, while in the third experiment, a reaction time of 16 hours was utilized.

*Experiment I*

The following reactants were charged to an 1100 ml. turbomixer autoclave; 60 grams of alginic acid, 80 grams of phenol, 200 ml. of n-pentane, and 238 grams of HF. The mixture was contacted for two hours at 0° C. and atmospheric pressure. At the end of the contact time, most of the hydrogen fluoride was flushed from the system by passing a stream of nitrogen through the autoclave. The product, which was transferred to a silver dish, weighed 123 grams after standing overnight in a hood-draft. At this point, the product was a tan slightly pink viscous syrup. The product was mascerated with several batches of dry ethyl ether. This changed the product into a gray solid. After drying under vacuum, this ether-washed product weighed 61 grams.

A portion of this latter ether-insoluble product (15 grams) was heated to the boiling point of water in 150 ml. of water, and the solution filtered. The insoluble material remaining on the filter after treatment with boiling water yielded 2.0 grams of a water-insoluble material. The 150 ml. of filtrate was evaporated to dryness, yielding 10.1 grams of dry residue.

*Experiment II*

This experiment was conducted in a manner similar to Experiment I with 60 grams of alginic acid, 80 grams of phenol, 200 ml. of n-pentane, and 236 grams of HF. The reactants were contacted for four hours at 0° C. The product was a brown colored paste and, after standing for a day in a hood-draft, weighed 141 grams and still contained some residual hydrogen fluoride.

A portion of this product (42 grams) was washed with 200 ml. of cold water. On filtration, 2.1 grams of a dry water-insoluble residue was obtained. The filtrate was extracted twice with 200 ml. of ethyl ether and the ether evaporated to leave a residue of 4.7 grams. The remaining aqueous filtrate was evaporated over steam to give a pink solid containing small hexagonal crystals and designated product I.

The remaining portion of the product in the silver dish was treated with 500 ml. of cold water, filtered, and the filtrate extracted three times with 300 ml. of ether. On evaporaion of the ether, 13.4 grams of dry product was obtained. The water-insoluble material weighed 4.7 grams. The aqueous filtrate on evaporation yielded 50 grams of product. Removal of unreacted phenol from the ether extract resulted in a separation of 8.9 grams of a reaction product, designated as product II.

The neutralization equivalent of product I was found to be approximately 200. The neutralization equivalent of product II was found to be approximately 345.

*Experiment III*

In this experiment, 60 grams of alginic acid, 80 grams of phenol, 200 ml. of n-pentane, and 223 grams of HF were contacted for 16 hours at 0° C. The product after standing overnight weighed 127 grams. The entire product was washed with water, and the solution filtered. The filtrate after standing in the hood-draft was concentrated to 132 grams. After dilution to 400 ml. with water, it was extracted twice with ether. On evaporation of the ether, 17 grams of dry residue was obtained. Concentration of the ether-washed water solution yielded 69 grams of dry residue, designated product III.

The 17 grams obtained by ether extraction were steam-distilled and the residue filtered and dried; final weight, 11 grams.

Twenty grams of product III was dissolved in 70 grams of water. A portion of this water solution after evaporation on a glass slide showed the presence of small prism crystals under a microscope. The total solution was concentrated under vacuum to yield 19.8 grams of dry residue. Analysis of this residue showed that it contained 1.53% fluorine, 56.08% carbon, and 5.56% hydrogen. It also had an ash content of 1.90%.

The neutralization equivalent of product III was found to be approximately 300. Material having surface-active properties was prepared from product III by dissolving 16 grams of product III in 471 ml. of 0.1 N sodium hydroxide solution. The solution was concentrated to 150 ml., then extracted twice with ether, and the water solution evaporated to dryness. 16.1 grams of a dry residue having surface-active properties was obtained.

In each of the three experiments mentioned above, the crude reaction product showed the presence of a crystalline material, usually hexagonal prisms, upon microscopic examination. A definite trend towards a larger recovery of products with longer contact times was observed in these three experiments. Also, the water soluble portion of the product becomes greater with longer contact times.

EXAMPLE II

This example illustrates the reaction of the condensation product of alginic acid and phenol with formaldehyde in the presence of various catalysts. The condensation product produced from alginic acid and phenol in the presence of hydrogen fluoride was not isolated in a pure form; therefore, various fractions of the crude product in varying degrees of purity were utilized. These fractions were condensed with formalin containing 36–38% by weight of formaldehyde. Both acidic and basic catalysts were used. In some of the experiments, the resins were cured in an oven or over a steam bath. Also, the solubility of some of the products in various solvents was examined.

*Experiment IV*

The following reagents were mixed together in a test tube:

Alginic acid-phenol derivative [1]_____g__ 1
Formalin_____cc__ 5
NH4OH (concentrated)_____cc__ 1

[1] The alginic acid-phenol derivative utilized in this experiment is described in Example I, Experiment I, as the 10.1 grams of dry residue which is ether-insoluble and water-soluble.

The resulting solution was transferred to an evaporating dish and the dish and its contents heated over steam. The residue remaining in the dish was reddish brown colored material, soluble in water, but insoluble in alcohol, acetone, ether, and benzene.

*Experiment V*

The following reagents were mixed together in a test tube:

Alginic acid-phenol derivative [1]_____g__ 1
Formalin_____cc__ 5
NH4OH (concentrated)_____cc__ 1

[1] See Experiment IV above.

The solution was transferred to an evaporating dish and the dish and contents placed in a desiccator and allowed to stand for over 3 days. The dish and its contents was then baked in an oven for three hours. The product was found to be soluble in water, but insoluble in ether, alcohol, benzene, and acetone. The material was dark red-brown in color.

*Experiment VI*

The following reagents were mixed in a test tube:

Alginic acid-phenol derivative [1]_____g__ 1
Formalin_____cc__ 5

[1] See Experiment IV above.

Dry ammonia gas was bubbled through the solution. The solution became dark red-brown in color. It was transferred to an evaporating dish at this point. As the mixture was allowed to evaporate, it became resinous.

*Experiment VII*

The following reagents were placed in a test tube:

| | | |
|---|---|---|
| Alginic acid-phenol derivative [1] | g | 1 |
| Formalin | cc | 4 |
| Acetic acid | | Excess |

[1] See Experiment IV above.

Dry hydrogen chloride was bubbled through the solution in a test tube. The solution became quite hot and turned a deep yellow color. It was then transferred to an evaporating dish and baked in an oven at 80–90° C. for several hours. The residue in the dish was a dark colored resin, insoluble in water, but soluble in acetone.

*Experiment VIII*

The following reagents were mixed in a test tube:

| | | |
|---|---|---|
| Alginic acid-phenol derivative [2] | g | 1 |
| Formalin | cc | 4 |
| Acetic acid | cc | 5 |

[2] The alginic acid-phenol derivative in this experiment is described in Example I, Experiment II as product I.

Hydrogen chloride gas was bubbled through the above solution. It became very hot and turned a very dark red-brown color. When diluted with water, an amorphous white colored precipitate separated from solution.

*Experiment IX*

The following reagents were mixed in a test tube:

| | | |
|---|---|---|
| Alginic acid-phenol derivative [3] | g | 1 |
| Formalin | cc | 4 |
| Acetic acid | cc | 5 |

[3] The alginic acid-phenol derivative used in this experiment is described in Example I, Experiment III as the 11 grams of dry residue which is obtained after steam distillation of 17 grams of ether-soluble, water-insoluble material.

Hydrogen chloride gas was bubbled through the solution. The solution became hot and then cloudy. A resinous precipitate separated from solution, insoluble in water and alcohol, but soluble in acetone.

*Experiment X*

The following reagents were mixed in a test tube:

| | | |
|---|---|---|
| Alginic acid-phenol derivative [3] | g | 1 |
| Formalin | cc | 5 |

[3] See Experiment IX above.

Ammonia gas was bubbled through the solution. The solution became hot and darker in color. After being transferred to an evaporating dish and baked in an oven overnight at 80° C., the resulting resin was insoluble in water, acetone, ethyl alcohol and ether.

The experiments described above amply demonstrate that resinous materials may be produced from alginic acid-phenol condensation products and formaldehyde. While in some of the experiments no actual resin was originally produced, viscous solutions were obtained which upon baking in an oven or evaporation resulted in resins. In one experiment (VIII), a resinous precipitate separated from solution similar to the way in which phenol-formaldehyde resins separate, definitely showing that high polymeric materials can be produced from alginic acid-phenol condensation products and formaldehyde. The resinous materials obtained from alginic acid-phenol condensation products and formaldehyde showed interesting solubility behavior. For example, in some cases, a water-soluble resin was produced, while in others a water-insoluble resin was produced. Also, both acetone-soluble and acetone-insoluble resins were produced. These unique solubility properties will enhance the utility of the materials.

I claim as my invention:

1. A process for producing a resin which comprises reacting formaldehyde with a product formed by condensing alginic acid and a phenol in the presence of a hydrogen fluoride catalyst.

2. A process for producing a resin which comprises reacting formaldehyde in the presence of an alkaline catalyst with a product formed by condensing alginic acid and a phenol in the presence of hydrogen fluoride catalyst and separating said product from said hydrogen fluoride.

3. A process for producing a resin which comprises reacting formaldehyde in the presence of an acidic catalyst with a product formed by condensing alginic acid and a phenol in the presence of hydrogen fluoride catalyst and separating said product from said hydrogen fluoride.

4. A process for producing a resin which comprises reacting formaldehyde in the presence of ammonia with a product formed by condensing alginic acid and a phenol in the presence of hydrogen fluoride catalyst and separating said product from said hydrogen fluoride.

5. A process for producing a resin which comprises reacting formaldehyde in the presence of acetic acid and hydrogen chloride with a product formed by condensing alginic acid and a phenol in the presence of hydrogen fluoride catalyst and separating said product from said hydrogen fluoride.

6. A resin formed by reacting formaldehyde with a product formed by condensing alginic acid and a phenol in the presence of a hydrogen fluoride catalyst.

References Cited in the file of this patent

UNITED STATES PATENTS 2,472,276   Bonner et al. _____ June 7, 1949

OTHER REFERENCES

Walker: Formaldehyde (1953), published by Reinhold Publishing Corp., New York, pages 143–145.